(12) United States Patent
Hwang et al.

(10) Patent No.: US 10,305,983 B2
(45) Date of Patent: May 28, 2019

(54) COMPUTER DEVICE FOR DISTRIBUTED PROCESSING

(71) Applicant: TmaxData Co., Ltd., Gyeonggi-do (KR)

(72) Inventors: Changho Hwang, Gyeonggi-do (KR); Seungtak Choi, Gyeonggi-do (KR)

(73) Assignee: TmaxDataCo., Ltd. (KR)

( * ) Notice: Subject to any disclaimer, the term of this patent is extended or adjusted under 35 U.S.C. 154(b) by 1 day.

(21) Appl. No.: 15/466,232

(22) Filed: Mar. 22, 2017

(65) Prior Publication Data

US 2018/0255135 A1    Sep. 6, 2018

(30) Foreign Application Priority Data

Mar. 6, 2017    (KR) .................. 10-2017-0028383

(51) Int. Cl.
*H04L 29/06*    (2006.01)
*H04L 29/08*    (2006.01)

(52) U.S. Cl.
CPC .......... *H04L 67/1095* (2013.01); *H04L 69/16* (2013.01)

(58) Field of Classification Search
CPC ........................... H04L 67/1095; H04L 69/16
USPC ........................................................ 709/223
See application file for complete search history.

(56) References Cited

U.S. PATENT DOCUMENTS

| 2007/0022092 A1* | 1/2007 | Nishizawa ........ G06F 17/30516 |
| 2011/0047554 A1* | 2/2011 | Lakshmanan ......... G06F 9/5088 718/105 |
| 2013/0138689 A1* | 5/2013 | Imamura ............... G06F 9/5088 707/770 |
| 2013/0254778 A1 | 9/2013 | Lakshmanan et al. |
| 2014/0052729 A1* | 2/2014 | Macho ............. G06F 17/30507 707/738 |
| 2015/0261831 A1 | 9/2015 | Murthy et al. |

(Continued)

FOREIGN PATENT DOCUMENTS

| JP | 2007026373 A | 2/2007 |
| JP | 2011-034255 A | 2/2011 |

(Continued)

OTHER PUBLICATIONS

Korean Office Action, corresponding application No. KR 10-2017-0028383, dated Dec. 15, 2017.

*Primary Examiner* — Nicholas R Taylor
*Assistant Examiner* — Chong G Kim
(74) *Attorney, Agent, or Firm* — Fish IP Law, LLP (57) ABSTRACT

Disclosed is a computer program stored in a computer readable storage medium including encoded commands according to an exemplary embodiment of the present disclosure. When the computer program is executed by one or more processors of a computer system, the computer program causes the one or more processors to perform the following procedures for the distributed processing. The procedures may include: analyzing queries included in a process by a processor to classify the queries into a distributed processing query and a centralized processing query; registering the distributed processing query in one or more distributed processing nodes among two or more nodes; registering the centralized processing query in a centralized processing node among two or more nodes; and receiving an event by each node.

10 Claims, 5 Drawing Sheets

(56) References Cited

U.S. PATENT DOCUMENTS

2015/0363464 A1* 12/2015 Alves ................ G06F 17/30448
707/765
2018/0075125 A1* 3/2018 Stiel .................. G06F 17/30584

FOREIGN PATENT DOCUMENTS

JP           2013502642 A    2/2012
KR    10-2015-0104585 A    9/2015

* cited by examiner

COMPUTER DEVICE FOR DISTRIBUTED PROCESSING

CROSS-REFERENCE TO RELATED APPLICATIONS

This application claims priority to and the benefit of Korean Patent Application No. 10-2017-0028383 filed in the Korean Intellectual Property Office on Mar. 6, 2017, the entire contents of which are incorporated herein by reference.

TECHNICAL FIELD

The present disclosure relates to a computing device, and more particularly, to a computing device for a distributed processing.

BACKGROUND ART

A complex event processing (CEP) is a process for extracting only a meaningful event from events occurring in real time to perform corresponding actions. During a stream data processing of data, the input data is processed in a memory without being recorded in a hard disk drive (HDD) so that the data may be processed at a high speed. Further, it is not necessary to process all the data because data processed immediately before is kept as intermediate data and a difference between the data which flows into the memory and the intermediate data is the amount of data which needs to be processed.

During such a complex event processing, a real-time property is important, so that an in-memory processing manner is used. In the complex event processing, scalability is supported in a scale-out and scale-up manner as in a distributed processing system. The scale-up manner is a manner which increases a performance of a computing device which performs the complex event processing and the scale-out manner is a manner which improves a processing ability by increasing the number of computing devices which perform the complex event processing.

When the scalability extends by the scale-out manner, a cost for extending is cheaper than that of the scale-up manner and a possibility of overall failure is low. In contrast, when the scalability extends by the scale-out manner, data consistency needs to be maintained.

RELATED ART DOCUMENT

Japanese Patent Application Laid-Open No. 2011-034255 (on Feb. 17, 2011).

SUMMARY OF THE INVENTION

The present disclosure has been made in effort to provide a solution for providing a distributed processing.

According to an aspect of the present disclosure, there is provided a computer program stored in a computer readable storage medium including encoded commands. When the computer program is executed by one or more processors of a computer system, the computer program causes the one or more processors to perform the following procedures for the distributed processing. The procedures may include: analyzing queries included in a process by a processor to classify the queries into a distributed processing query and a centralized processing query; registering the distributed processing query in one or more distributed processing nodes among two or more nodes; registering the centralized processing query in a centralized processing node among two or more nodes; and receiving an event by each node.

Alternatively, the procedure may further include causing the distributed processing query to perform the event when the distributed processing query is capable of processing the received event.

Alternatively, the procedure may include determining to transmit the event to a centralized processing node when the distributed processing query is not capable of processing the event.

Alternatively, the distributed processing query may include a query which processes an operation on each of the events and the centralized processing query may include a query which processes an operation by combining two or more events.

Alternatively, the registering of the distributed processing query in one or more distributed processing nodes among two or more nodes may include registering the distributed processing query in a memory of the distributed processing node and the registering of the centralized processing query in a centralized processing node among two or more nodes may include registering the centralized processing query in a memory of the centralized processing node.

Alternatively, the registering of the distributed processing query in one or more distributed processing nodes among two or more nodes may include, registering the distributed processing query in the distributed processing node by adding a command to transmit the event to the centralized processing node when an event which is not processed by the distributed processing query is received by the distributed processing query.

Alternatively, the determining to transmit the event to a centralized processing query when the distributed processing query is not capable of processing the event may include causing a dedicated adaptor of a node which receives the event to transmit the event to a dedicated adaptor of the centralized processing node.

Alternatively, the causing of a dedicated adaptor of a node which receives the event to transmit the event to a dedicated adaptor of the centralized processing node may include transmitting the event from the distributed processing query to the centralized processing query on a memory when a node which receives the event is the same as the centralized processing node and transmitting the event to the centralized processing query using a TCP or HTTP protocol when the node which receives the event is different from the centralized processing node.

Alternatively, the centralized processing node may be the same as the distributed processing node among two or more nodes or different from the distributed processing node and may be determined to distribute a load.

Alternatively, the procedure may further include transmitting a processing result of the event of the distributed processing query to the centralized processing node when the event is processed by the distributed processing query.

Alternatively, the procedure may further include causing the centralized processing node to receive the processing result of the event of the distributed processing query to process the centralized processing query.

Alternatively, the query may be generated based on a continuous query language (CQL).

According to another aspect of the present disclosure, there is provided a method for a distributed processing which is executed by one or more processors of a computing device. The method includes: analyzing queries included in a process by a processor to classify the queries into a distributed processing query and a centralized processing query; registering the distributed processing query in one or more distributed processing nodes among two or more nodes; registering the centralized processing query in a centralized processing node among two or more nodes; and receiving an event, by each node.

According to another aspect of the present disclosure, there is provided a computing device. The computing device includes: one or more processors and a memory which stores commands executed by the one or more processors. The one or more processors analyze queries included in a process to classify the queries into a distributed processing query and a centralized processing query, register the distributed processing query in one or more distributed processing nodes among two or more nodes, register the centralized processing query in a centralized processing node among two or more nodes, and receive the event in each node.

According to the present disclosure, a solution for providing a distributed processing may be provided.

DETAILED DESCRIPTION

Various exemplary embodiments will be described with reference to the drawings and like reference numerals denote like components throughout the drawings. In the specification, various descriptions are suggested to provide understanding of the present disclosure. However, it is obvious that the exemplary embodiments may be embodied without having the specific description. In other examples, known structures and devices are provided as a block diagram to easily describe the exemplary embodiments.

Terms such as "component", "module", or "system" used in the specification indicate a computer-related entity, hardware, firmware, software, a combination of software and hardware, or execution of software. For example, a component may be a procedure which is executed in a processor, a processor, an object, an execution thread, a program and/or a computer, but is not limited thereto. For example, both an application which is executed in a computing device and a computing device may be a component. One or more components may be stayed in a processor and/or an executing thread, and one component may be localized in one computer or distributed between two or more computers. Such components may be executed from various computer readable media having various data structures stored therein. The components may communicate with each other through local and/or remote processings, for example, in accordance with a signal (for example, data transmitted through other system and a network such as the Internet through data and/or a signal from one component which interacts with other components in a local system or a distributed system) having one or more data packets.

Description of the suggested exemplary embodiment is provided to allow those skilled in the art to use or embody the present disclosure. Various modifications of the exemplary embodiments may be apparent to those skilled in the art and general principles defined herein may be applied to other exemplary embodiments without departing from the scope of the present disclosure. Therefore, the present disclosure is not limited to the exemplary embodiments suggested herein, but interpreted in a broadest range which is consistent with principles suggested herein and new features.

Figure 1:
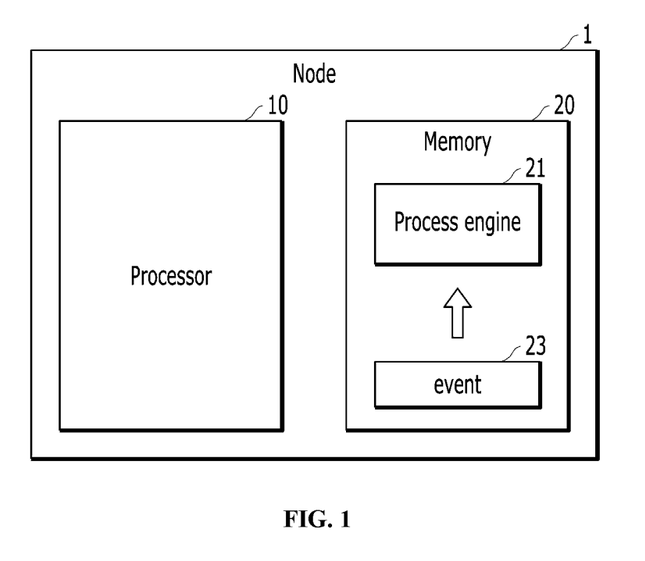
FIG. 1 is an exemplary view illustrating components which perform a complex event processing on a computing device according to an exemplary embodiment of the present disclosure.

FIG. 1 is an exemplary view illustrating components which perform a complex event processing on a computing device according to an exemplary embodiment of the present disclosure.

A computing device 1 which performs a complex event processing according to an exemplary embodiment of the present disclosure includes a processor 10 and a memory 20. A node 1 of the present disclosure may include a server or a computing device.

The computing device 1 according to the exemplary embodiment of the present disclosure may configure a data stream management system (DSMS) and may be connected to a database management system (DBMS) to store data streams. Generally, the data stream management system DSMS may include a system which performs continuous query on a large quantity of stream data. The stream data is a set of events including a continuous event, for example, may include data such as a table of a database. However, the present disclosure is not limited to the above-described example of stream data.

The processor 10 controls an overall operation of the computing device and may include one or more cores and one or more threads. The processor 10 may include a central processing unit (CPU) of the computing device.

The memory 20 may store programs, processes, and commands which may be executed by the processor. The query may be loaded in a process engine 21 on the memory as an instance and the query may be performed whenever events 23 occur. The query according to the exemplary embodiment of the present disclosure may be generated based on a continuous query language (CQL). The query according to the exemplary embodiment of the present disclosure is registered in advance in the system. Since the query is registered in advance in the system, the data stream (event) may be processed as soon as it occurs. The event may be sequentially processed in accordance with the occurring order. Therefore, a time for storing the data or retrieving data is saved so that the processing time of the entire system is dramatically improved, thereby easily performing the processing of big data. A separate query for storing the data may be used. The event is loaded from a permanent storage device to be loaded in the memory 20 or received through a network connection to be received by the memory 20.

According to the exemplary embodiment of the present disclosure, the query is registered in the engine and is loaded on the memory as an instance. Further, whenever a new event occurs, the query is performed, so that the processing speed of the system may be improved.

Figure 2:
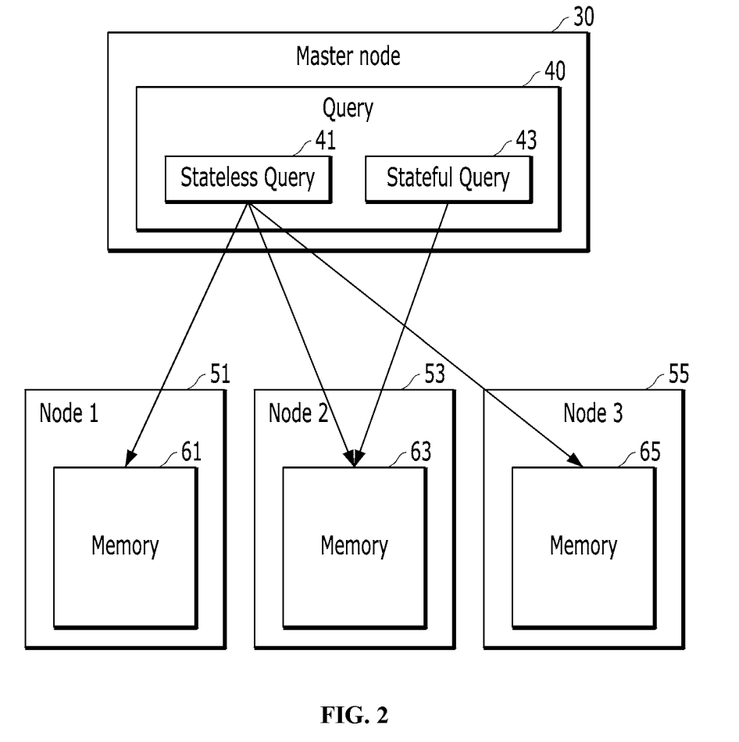
FIG. 2 is an exemplary view illustrating components which perform registration of queries on a computing device according to an exemplary embodiment of the present disclosure.

FIG. 2 is an exemplary view illustrating components which perform registration of queries on a computing device according to an exemplary embodiment of the present disclosure.

A processor of a master node 30 analyzes one or more queries 40 included in the process to classify the queries into a distributed processing query 41 (stateless query) and a centralized processing query 43 (stateful query). Here, the distributed processing query 41 includes a query which performs an operation on individual events and the centralized processing query 43 includes a query which performs the operation by combining two or more events. For example, the distributed processing query 41 may include a query which may be determined for one event, such as filtering. The centralized processing query may include a query which may perform the operation only when the entire data stream is obtained, such as grouping, aggregation, and join. The data stream may include a set of events and may correspond to the table of the database. The distributed processing query may include a query which has the same overall result even though the query is performed independently on each of the plurality of nodes. The centralized processing query may include a query which may have different result values when the query is performed on the distributed nodes. However, the above-described queries are merely examples, but the present disclosure is not limited thereto.

For example, there may be a process including a scenario in which a discount coupon is transmitted as a text message to a customer who purchases a promotional product three times or more within the recent one week. The process may include a "query (a first sub query) which filters only the promotion product purchase history from all purchase histories", a "query (a second sub query) which calculates the number of purchases within the recent one week for every customer" and a "query (a third sub query) which filters information only on customers whose number of purchases is three or larger". In the above example, the first sub query determines whether the product is a promotion product from the purchase histories corresponding to the events so that the first sub query may be included in the distributed processing query 41. The second sub query needs to calculate the number of purchases after receiving all of the event streams of the purchase histories for every client corresponding to two or more events, so that the second sub query may be included in the centralized processing query 43. The third sub query may perform the operation only using the number of purchases of the client corresponding to the events, so that the third sub query may be included in the distributed processing query 41.

Examples of specific queries will be described below.

It is assumed that the event is configured by userID, itemName, and timestamp fields.

(SubQuery#1: Filter only promotion product purchase history in all purchase histories)
insert into TargetItemStream
select *
from PurchasedStream
where itemName == "EVENT_PRODUCT";
(SubQuery#2: Calculate number of purchase within recent one week for every client)
insert into CheckStream
select user ID, count(*) as numPurchased
group by userID
from TargetItemStream#window.time(7 days);
(SubQuery#3: Filter information only on client whose number of -continued purchases is three or larger)
insert into CouponStream
select userID
from CheckStream
where numPurchased >= 3;

In the above-described example, the first sub query determines whether the purchase history corresponds to a promotion product from the events of the purchase histories so that the first sub query corresponds to the distributed processing query. The second sub query adds the processing results of the first sub query for every client so that the query is processed by obtaining the plurality of purchase histories (a plurality of events) of each client. Therefore, the second sub query corresponds to the centralized processing query. The third sub query filters the number of purchases which is three or larger in the processing result (for example, a value of the number of purchases of each customer) of the second sub query to determine whether the number of purchases of a customer corresponding to each event is three or larger. Therefore, the third sub query may correspond to the distributed processing query.

However, the above-described scenario and queries are merely examples, but the present disclosure is not limited thereto.

A master node 30 compiles the query to generate an execution plan and analyze the execution plan to classify the query included in the process into the distributed processing query and the centralized processing query.

The master node 40 may register the distributed processing query in one or more distributed processing nodes 51, 53, and 55 among two or more nodes. Since the distributed processing query performs the operation on each of the events, the same result may be obtained regardless of which node performs the operation. Accordingly, the distributed processing queries may be distributed at each node. Therefore, the master node 40 may register the distributed processing queries 41 in respective memories 61, 63, and 65 of the distributed processing nodes 51, 53, and 55.

The master node 40 may register the centralized processing query 43 in a centralized processing node 53. Since the centralized processing query 43 includes a query which may have different results when the distributed processing is performed, the centralized processing query 43 may be registered in one centralized processing node 53 to be processed in one node. Here, the centralized processing node 53 is one of the overall nodes and may be one of the distributed processing nodes or a separate node which is different from the distributed processing nodes. In the example of FIG. 2, one exemplary embodiment in which the centralized processing node is one of the distributed processing nodes is illustrated. In this case, the master node 30 may determine the centralized processing node based on a performance of the respective nodes and a load of the respective nodes to distribute the load.

When the distributed processing query 41 is registered in each of the distributed processing nodes, if an event which may not be processed by the distributed processing query is received, the master node 40 additionally registers a command to transmit the event to the centralized processing node 53 in the distributed processing query 41. In the distributed processing query and the centralized processing query, events for processing the query may be different from each other. In the above-described example, when an event including the promotion product purchase history for every customer is received by the distributed processing node 51, the first sub query which filters the promotion product purchase history for every customer may not perform the query. In this case, in order to cause the centralized processing query of the centralized processing node 53 to perform the query on the event, the distributed processing node 51 may transmit events which cannot be processed by itself to the centralized processing node 53. When the distributed processing query 41 is registered, the master node 30 may register the query in the distributed processing node together with a command to transmit the event which may not be processed by the master node 30 to the centralized processing node 53 thereto.

The master node 30 may connect the distributed processing query registered in each node and the centralized processing node registered in the centralized processing node by a dedicated adapter to transmit the event.

According to the exemplary embodiment of the present disclosure, the distributed processing queries are registered in each of the distributed processing nodes to distribute and process the event and allow the centralized processing query to process an event which cannot be processed by the distributed processing query by transmitting the processing result of the distributed processing query and the event which cannot be processed by the distributed processing query to the centralized processing node, so that the consistency of the data may be maintained while performing the distributed processing in a scale-out manner.

Figure 3:
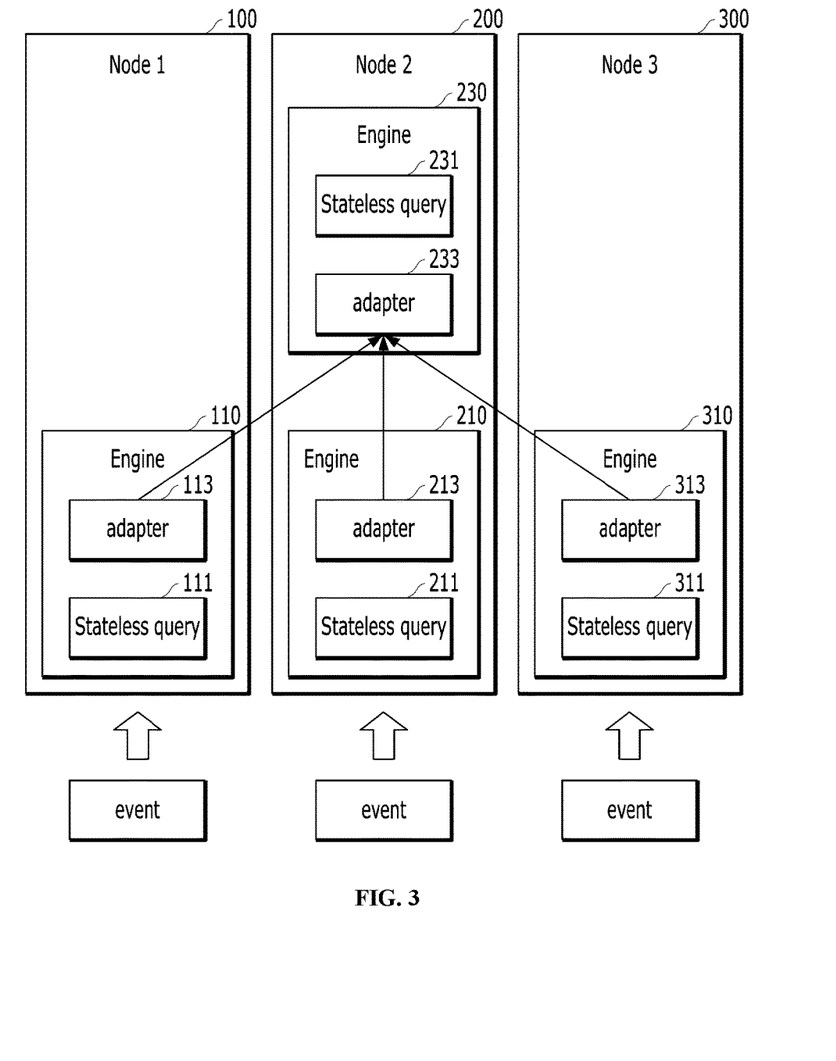
FIG. 3 is an exemplary view illustrating components which perform a distributed processing on a computing device according to an exemplary embodiment of the present disclosure.

FIG. 3 is an exemplary view illustrating components which perform a distributed processing on a computing device according to an exemplary embodiment of the present disclosure.

As described above with reference FIG. 2, the distributed processing query and the centralized processing query may be registered in the plurality of nodes. According to an exemplary embodiment of the present disclosure, a distributed processing system may include a plurality of nodes 100, 200, and 300. In FIG. 3, it is illustrated that the second node 200 performs both a function of the distributed processing node and a function of the centralized processing node. However, the distributed processing node and the centralized processing node may be located in different nodes.

When the distributed processing nodes 100, 200, and 300 receive an event, if the received event can be processed by the distributed processing queries 111, 211, and 311, the distributed processing queries may perform the event. For example, in the above-described example, when the distributed processing queries are queries which filter the promotion product purchase history among the purchase histories of the customer, if the purchase histories are received by the nodes 100, 200, and 300 as events, the distributed processing queries may determine whether the purchase history is a purchase history for the promotion product. However, the above-described queries are merely examples, but the present disclosure is not limited thereto. The distributed processing queries 111, 211, and 311 which are instantiated in the distributed processing engines 110, 210, and 310 of the nodes may process the events and transmit the processing result to the centralized processing engine 230 of the centralized processing node 200.

When the distributed processing nodes 100, 200, and 300 receive an event, if the received event cannot be processed by the distributed processing queries 111, 211, and 311, the distributed processing queries 111, 211, and 311 may determine to transmit the event to the centralized processing node 200. When the distributed processing queries 111, 211, and 311 cannot process the received event, the distributed processing queries 111, 211, and 311 may transmit the event to the centralized processing engine 230 to cause the centralized processing query 231 to process the event.

The event may be transmitted to an adaptor 233 of the centralized processing engine through adaptors 113, 213, and 313 of the distributed processing engines. When the distributed processing query transmits the processing result to the centralized processing node and when the distributed processing query transmits an event which cannot be processed by the distributed processing query to the centralized processing node, the result value of the distributed processing query and the event may be transmitted to the dedicated adaptor of the centralized processing engine through the dedicated adaptor of the distributed processing engine. In this case, when the dedicated adaptor of the distributed processing engine and the dedicated adaptor of the centralized processing engine are located in the same node (for example, the second node 200 serves as both the centralized processing node and the distributed processing node), the event may be transmitted from the distributed processing query to the centralized processing query on the memory. When the dedicated adaptor of the distributed processing engine and the dedicated adaptor of the centralized processing engine are located in different nodes (for example, when the first node 100 receives the event but the distributed processing query 111 cannot process the event, the event is transmitted to the second node 200), the event may be transmitted using a network protocol such as TCP or HTTP.

The centralized processing node 200 may receive the processing result of the event of the distributed processing query to perform the centralized processing query. In the above-described example, the centralized processing node 200 may receive the processing result of the distributed processing query obtained by filtering only the promotion product purchase history from all purchase histories from the distributed processing engines of the first, second, and third nodes. The centralized processing node 200 receives all purchase histories of the promotion product to classify the purchase histories for every customer and calculate the number of purchases for every customer within one week. However, the above-described processes and queries are merely examples, but the present disclosure is not limited thereto. When it is necessary for the distributed processing query to perform the distributed processing on the processing result of the centralized processing query performed in the centralized processing node 200, the processing result of the centralized processing query may be distributed to the distributed processing nodes. For example, in the above-described example, as the query result of the centralized processing query, the number of purchases of the customer for one week is generated. This may be an event on which the distributed processing may be performed by the third sub query, so that the query result of the centralized processing query may be distributed to the distributed processing nodes.

According to the exemplary embodiment of the present disclosure, a query which has the same result as being processed in a single node even when it is distributed in each node to be processed is classified as a distributed processing query and a query which may obtain a correct processing result only when it is processed in the single node is classified as a centralized processing query. The distributed processing query is registered in the distributed processing node to be distributed and the centralized processing query is registered in a centralized processing node to be processed in the single node. Further, the distributed processing node transmits the result of the distributed processing query and an event which cannot be processed by itself to the centralized processing node. As a result, a scale-out type distributed processing clustering with a relatively low implementing cost is implemented to increase the performance and maintain the consistency.

Figure 4:
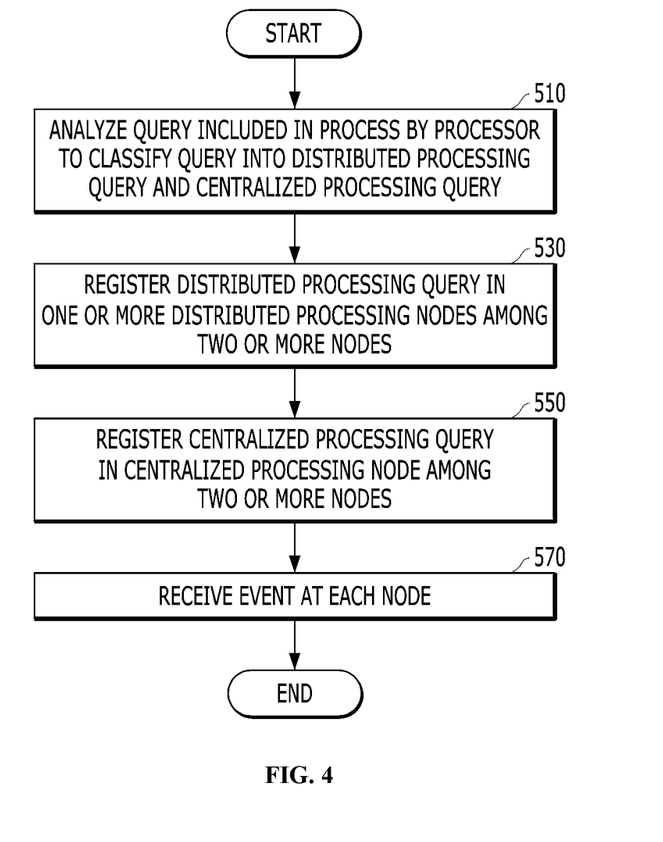
FIG. 4 is a flowchart of a distributed processing method performed on a computing device according to an exemplary embodiment of the present disclosure.

FIG. 4 is a flowchart of a distributed processing method performed on a computing device according to an exemplary embodiment of the present disclosure.

A processor of the master node analyzes a query included in the process to classify the query into the distributed processing query and the centralized processing query in step 510. The master node analyzes the process to establish an execution plan and in this case, classifies the plurality of queries included in the process into a distributed processing query and a centralized processing query. The distributed processing query is a query which performs a query for each event and may include a query which has the same result value even though the query is processed by being distributed into a plurality of nodes. The centralized processing query is a query which performs an operation by combining two or more events and may include a query which may have different result values when the query is processed by being distributed into the plurality of nodes. The query according to the exemplary embodiment of the present disclosure may be generated based on a continuous query language (CQL) and is registered in a process engine on the memory to be loaded as an instance. Therefore, as soon as the event occurs, the query may be immediately processed.

The master node registers the distributed processing query in one or more distributed processing nodes among two or more nodes in step 530. The master node registers the distributed processing query in memories of one or more distributed processing nodes among two or more nodes. The distributed processing node may include all one or more nodes of the system or all nodes excluding the centralized processing node.

The master node may register the centralized processing query in the centralized processing node among two or more nodes in step 550. The centralized processing node may be included in the distributed processing node or may be a separate node different from the distributed processing node. The master node may determine a centralized processing node to distribute the loads.

The event may be received at each node in step 570. According to the exemplary embodiment of the present disclosure, since the query is loaded on the memory as an instance, the occurring event may be acquired by the memory of each node. When the distributed processing query of each distributed processing node may process the received event by itself, the distributed processing query may process the event to transmit the processing result of the distributed processing query to the centralized processing node. When the received event cannot be processed by itself, the distributed processing query may transmit the received event to the centralized processing query to cause the centralized processing query to process the received event.

Figure 5:
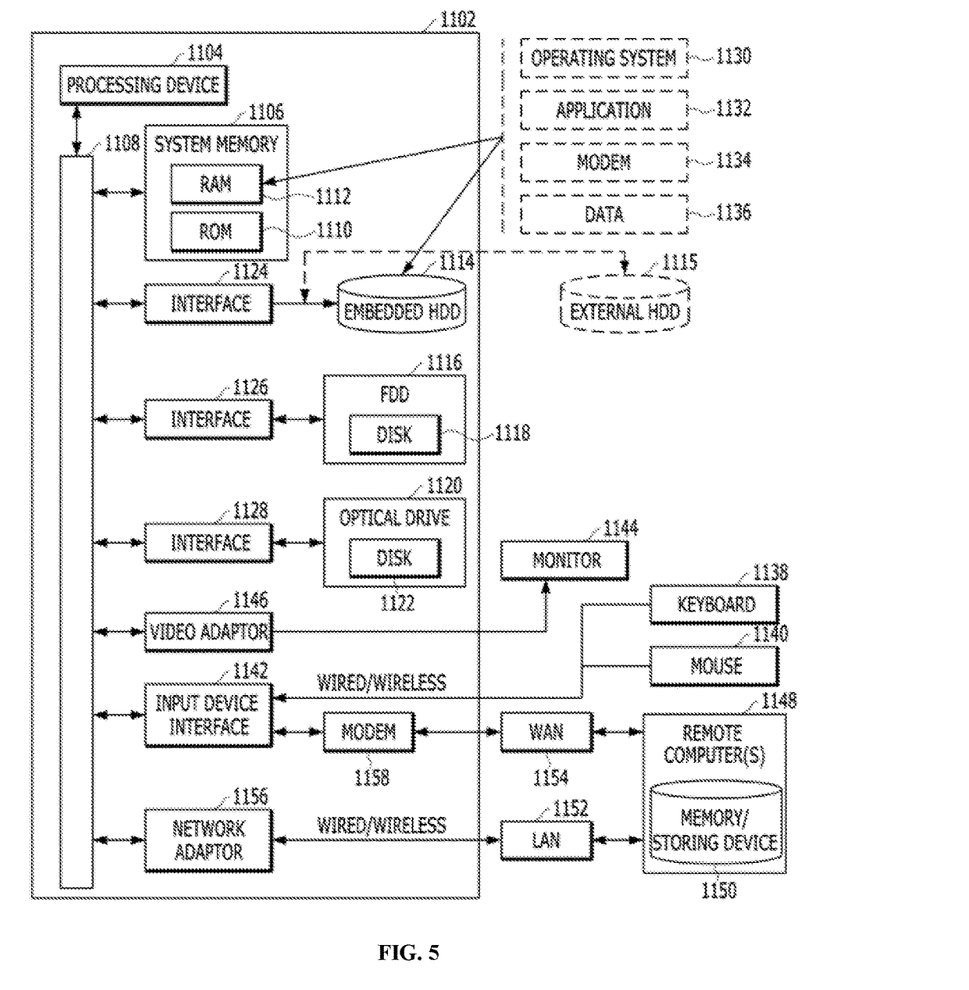
FIG. 5 is a block diagram of a computing device according to an exemplary embodiment of the present disclosure.

FIG. 5 is a block diagram of a computing device according to an exemplary embodiment of the present disclosure.

FIG. 5 illustrates a simple and general schematic view of an exemplary computing environment in which exemplary embodiments of the present disclosure are embodied.

Even though the present disclosure is generally described in regard to a computer executable instruction which may be executed on one or more computer, it is obvious to those skilled in the art that the present disclosure may be implemented by being coupled with other program modules and/or a combination of hardware and software.

Generally, the program module includes a routine, a program, a component, a data structure, or the like which performs a specific task or implements a specific abstract data type. Further, those skilled in the art may understand that the method of the present disclosure may be embodied not only by a single processor or a multi-processor computer system, a mini computer, and a main frame computer, but also a personal computer, a hand-held computing apparatus, microprocessor based or programmable home appliances, and the like (which may be connected to one or more related devices to be operated), and other computer system configurations.

The described exemplary embodiments of the present disclosure may also be embodied in a distributed computing environment in which some tasks are performed by remote processing devices which are connected to each other through a communication network. In the distributed computing environment, a program module may be located in both local and remote memory storage devices.

Generally, a computer includes various computer readable media. If a medium is accessible by the computer, the medium may be the computer readable medium and the computer readable medium includes volatile and non-volatile media, transitory and non-transitory media, and mobile and non-mobile media. As an example which is not limitation, the computer readable medium may include a computer readable storage medium and a computer readable transmission medium. The computer readable storage medium includes a volatile or non-volatile medium, a transitory or non-transitory medium, and a mobile or a non-mobile medium which are implemented by an arbitrary method or technique which stores information such as a computer readable instruction, a data structure, a program module or other data. The computer storage medium includes a RAM, a ROM, an EEPROM, a flash memory, or other memory techniques, a CD-ROM, a digital video disk (DVD), or other optical disk storage devices, a magnetic cassette, a magnetic tape, a magnetic disk storage device, or other magnetic storage devices, or other arbitrary media which are accessed by a computer and is used to store desired information, but is not limited thereto.

The computer readable transmission medium generally implements a computer readable instruction, a data structure, a program module, or other data in a modulated data signal such as a carrier waver or other transport mechanism and includes all information transfer media. A term of modulated data signal refers to a signal in which one or more properties of the signal are set or changed to encode information in the signal. As an example which is not limitation, the computer readable transmission medium includes a wired medium such as a wired network or direct wired connection and a wireless medium such as sound, RF, infrared ray, or other wireless medium. It is considered that a combination of any of the above-mentioned media may also be included in the scope of the computer readable transmission medium.

An exemplary environment 1100 including a computer 1102 which implements various aspects of the present disclosure is illustrated and the computer 1102 includes a processing device 1104, a system memory 1106, and a system bus 1108. The system bus 1108 connects system components including a system memory 1106 (not to be limited thereto) to the processing device 1104. The processing device 1104 may be an arbitrary processor among various commercial processors. A dual processor and other multiprocessor architectures may also be used as the processing device 1104.

The system bus 1108 may be any of the several types of bus structures which are additionally connected to a local bus which uses any of a memory bus, a peripheral device bus, and various commercial bus architectures. The system memory 1106 includes a read only memory (ROM) 1110 and a random access memory RAM 1112. A basic input/output system (BIOS) is stored in a non-volatile memory 1110 such as a ROM, an EPROM, and an EEPROM and the BIOS includes a basic routine which assists to transmit information between components in the computer 1102 while the computer is activated. The RAM 1112 may further include a fast RAM such as a static RAM for caching data.

The computer 1102 further includes an embedded hard disk drive (HDD) 1114 (for example, EIDE, SATA) which may be configured as an external disk in an appropriate chassis (not illustrated), a magnetic floppy disk drive (FDD) 1116 (for example, to read data from a portable diskette 1118 or record data therein), and an optical disk driver 1120 (for example, to read a CD-ROM disk 1112 or read data from other high quantity optical medium such as a DVD or record data therein). The hard disk drive 1114, the magnetic disk drive 1116, the optical disk drive 1120 may be connected to the system bus 1108 through a hard disk drive interface 1124, a magnetic disk drive interface 1126, and an optical drive interface 1128. The interface 1124 for implementing an external drive may include at least one or both of universal serial bus (USB) and IEEE 1394 interface technique.

These drives and a computer readable medium related therewith provide non-volatile storage of data, a data structure, a computer executable instruction, or the like. In the case of the computer 1102, the drive and the medium correspond to storing arbitrary data as an appropriate digital type. In the description of the computer readable medium, an HDD, a portable magnetic disk, and a portable optical medium such as a CD or a DVD have been mentioned. However, it is well known to those skilled in the art that other types of computer readable media such as a zip drive, a magnetic cassette, a flash memory card, a cartridge, or the like may also be used in an exemplary operating environment and the arbitrary medium may include a computer executable instruction which performs the methods of the present disclosure.

A large number of program modules including an operating system 1130, one or more application programs 1132, other program module 1134, and program data 1136 may be stored in the drive and the RAM 1112. The operating system, the application, module and/or all or a part of data are also cached by the RAM 1112. It is obvious that the present disclosure may be implemented by various commercially applicable operating systems or a combination of operating systems.

A user may input a command and information to the computer 1102 through one or more wired/wireless input devices, for example, a pointing device such as a keyboard 1138 and a mouse 1140. Other input devices (not illustrated) may include a microphone, an IR remote controller, a joystick, a game pad, a stylus pen, a touch screen, or the like. These and other input devices are sometimes connected to the processing device 1104 through an input device interface 1142 which is connected to the system bus 1108, but may be connected by a parallel port, an IEEE 1394 serial port, a game port, a USB port, an IR interface, or other interfaces.

A monitor 1144 or other type of display device is also connected to the system bus 1108 through an interface such as a video adaptor 1146. In addition to the monitor 1144, a computer generally includes other peripheral output devices (not illustrated) such as a speaker or a printer.

The computer 1102 may operate in a networked environment using logical connection of remote computer(s) 1148 to one or more remote computers through wired and/or wireless communication. The remote computer(s) 1148 may be a workstation, a computing device computer, a router, a personal computer, a portable computer, a microprocessor based amusement machine, a peer device, or other general network nodes and generally, includes a large number of or all the components which have been described for the computer 1102. However, for the purpose of simplicity, only a memory storage device 1150 is illustrated. The illustrated logical connection includes wired/wireless connection to a local area network (LAN) 1152 and/or larger network, for example, a wide area network (WAN) 1154. The LAN and WAN networking environments are general in an office and a company and facilitate enterprise-wide computer network such as intranet and these are all connected to a worldwide computer network, for example, Internet.

When the computer 1102 is used in the LAN networking environment, the computer 1102 is connected to a local network 1152 through a wired and/or wireless communication network interface or an adaptor 1156. The adaptor 1156 facilitates wired or wireless communication to the LAN 1152 and the LAN 1152 also includes a wireless access point provided therein to communicate with the wireless adaptor 1156. When the computer 1102 is used in the WAN networking environment, the computer 1102 has other means, for example, includes a modem 1158 or is connected to a communication computing device on the WAN 1154, or uses the Internet to set communication through the WAN 1154. The modem 1158 which may be an embedded or external, and a wired or wireless device is connected to the system bus 1108 through the serial port interface 1142. In a networked environment, program modules described for the computer 1102 or a part thereof may be stored in the remote memory/storage device 1150. It is understood that the illustrated network connection is an example and other means to set a communication link between computers may be used.

The computer 1102 performs operations to communicate with an arbitrary wireless device or entity which is disposed through wireless communication to operate, for example, a printer, a scanner, a desktop and/or portable computer, a portable data assistant (PDA), a communication satellite, arbitrary equipment or location related with a wireless detectable tag, and a telephone. This includes at least Wi-FI and Bluetooth wireless technology. Therefore, communication may be a previously defined structure such as a network of the related art or simply ad hoc communication between at least two devices.

Wi-Fi (wireless fidelity) may allow connection to the Internet without using a wire. The Wi-Fi is a wireless technique such as a cell phone which allows such a device, for example, a computer to transmit and receive data indoor and outdoor, that is, in any place within a coverage of a base station. The Wi-Fi network uses a wireless technology called IEEE 802.11 (a,b,g, or the like) to provide safe, reliable, and fast wireless connection. Wi-Fi is used to connect computers to each other or to the Internet, and a wired network (IEEE 802.3 or Ethernet is used). The Wi-Fi network operates at a 11 Mbps (802.11a) or 54 Mbps (802.11b) data rate in an unauthorized wireless band of 2.4 and 5 GHz or operates in a product including both bands (dual band).

Those skilled in the art may understand that information and signals may be represented using various arbitrary technologies and techniques. For example, data, indications, commands, information, signals, bits, symbols, and chips which may be referred in the above description may be represented by voltages, currents, electromagnetic waves, magnetic fields or particles, optical fields or particles, or an arbitrary combination thereof.

Those skilled in the art may understand that various exemplary logical blocks, modules, processors, units, circuits, and algorithm steps which have been described with respect to the exemplary embodiments disclosed herein may be implemented by electronic hardware, various types of programs (for the convenience, referred to as "software" here), a design code, or a combination thoseof. In order to clearly describe compatibility of hardware and software, various exemplary components, blocks, modules, circuits, and steps are generally described above with respect to functions thoseof. Whether these functions are implemented as hardware or software is determined depending on design restrictions which are applied to a specific application and the entire system. Those skilled in the art may implement the function, which is described by various methods, of the specific application but the implementation determination is not interpreted to depart from the scope of the present disclosure.

Various exemplary embodiments suggested herein may be implemented by a method, a device, or a standard programming and/or an article using an engineering technique. A term of "article" includes a computer program which is accessible from an arbitrary computer readable device, a carrier or a medium. For example, the computer readable medium includes a magnetic storage device (for example, a hard disk, a floppy disk, or a magnetic strip), an optical disk (for example, a CD or a DVD), a smart card, and a flash memory device (for example, an EEPROM, a card, a stick, or a key drive), but is not limited thereto. Further, various storage media suggested herein includes one or more devices for storing information and/or other machine readable media. The term of "machine readable medium" includes a wireless channel which stores, contains, and/or transmits command (s) and/or data and various other media, but is not limited thereto.

It should be understood that a specific order or a hierarchical structure of steps in suggested processes are examples of exemplary approaches. It should be understood that a specific order or a hierarchical structure of steps in the processes may be rearranged within the scope of the present disclosure, based on a design priority. The accompanying method claims provide elements of various steps in the order of sample, but the claims are not meant to be limited to the suggested specific order or hierarchical structure.

Description of the suggested exemplary embodiment is provided to allow those skilled in the art to use or embody the present disclosure. Various modifications of the exemplary embodiments may be apparent to those skilled in the art and general principles defined herein may be applied to other exemplary embodiments without departing from the scope of the present disclosure. Therefore, the present disclosure is not limited to the exemplary embodiments suggested herein, but interpreted in a broadest range which is consistent with principles suggested herein and new features.

What is claimed is:

1. A computer program stored in a non-transitory computer readable storage medium including encoded commands, wherein when the computer program is executed by one or more processors of a computer system, the computer program causes the one or more processors to perform procedures for a distributed processing, and the procedures comprise:

generating an execution plan by compiling queries included in a process by a processor of a master node;
analyzing the execution plan to classify the queries into a distributed processing query which performs an operation on individual events and which is performed independently on each of the plurality of nodes and a centralized processing query which performs the operation by combining two or more events and which may perform the operation only when the entire data stream that includes a set of events is obtained by the processor of the master node;
registering the distributed processing query in a memory of one or more distributed processing nodes among two or more nodes by a processor of the distributed processing node to load the query as an instance on the memory;
registering the centralized processing query in a memory of a centralized processing node among two or more nodes by a processor of the centralized processing node to load the query as an instance on the memory;
loading an event from a permanent storage device to be loaded in the memory or receiving the event through a network connection by each node;
causing the processor of the distributed processing node to perform the event by a distributed processing query which is loaded on the memory of the distributed processing node as an instance when the distributed query is capable of processing the received event; and
determining to transmit the event to a centralized processing node by the processor of the distributed processing node when the distributed processing query is not capable of processing the event.

2. The computer program stored in a non-transitory computer readable storage medium according to claim 1, wherein the registering of the distributed processing query in a memory of one or more distributed processing nodes among two or more nodes by a processor of the distributed processing node to load the query as an instance on the memory includes:
registering the distributed processing query in the memory of a distributed processing node by adding a command to transmit the event to a dedicated adaptor of the centralized processing node when an event which is not processed by the distributed processing query is received by the distributed processing query.

3. The computer program stored in a non-transitory computer readable storage medium according to claim 1, wherein the determining to transmit the event to a centralized processing query when the distributed processing query is not capable of processing the event includes causing a dedicated adaptor of a node which receives the event to transmit the event to a dedicated adaptor of the centralized processing node.

4. The computer program stored in a non-transitory computer readable storage medium according to claim 3, wherein the causing of a dedicated adaptor of a node which receives the event to transmit the event to a dedicated adaptor of the centralized processing node includes:
transmitting the event from an instance of the distributed processing query to an instance of the centralized processing query on a memory when a node which receives the event is the same as the centralized processing node and
transmitting the event to the centralized processing node using a TCP or HTTP protocol when the node which receives the event is different from the centralized processing node.

5. The computer program stored in a non-transitory computer readable storage medium according to claim 1, wherein the centralized processing node is the same as the distributed processing node among two or more nodes or different from the distributed processing node and is determined to distribute a load.

6. The computer program stored in a non-transitory computer readable storage medium according to claim 1, wherein the procedure further includes:
 transmitting a processing result of the event of the distributed processing query from a distributed processing node to the centralized processing node when the event is processed by the distributed processing query of the distributed processing node.

7. The computer program stored in a non-transitory computer readable storage medium according to claim 1, wherein the procedure further includes:
 causing the centralized processing node to receive the processing result of the event of the distributed processing query to process the centralized processing query based on the result of the distributed processing query by the processor of the centralized processing node.

8. The computer program stored in a non-transitory computer readable storage medium according to claim 1, wherein the query is generated based on a continuous query language (CQL).

9. A method for a distributed processing which is executed by one or more processors of a computing device, the method comprising:
 generating an execution plan by compiling queries included in a process by a processor of a master node;
 analyzing the execution plan to classify the queries into a distributed processing query, which performs an operation on individual events and which is performed independently on each of the plurality of nodes, and a centralized processing query, which performs the operation by combining two or more events and which may perform the operation only when the entire data stream that includes a set of events is obtained by the processor of the master node;
 registering the distributed processing query in a memory of one or more distributed processing nodes among two or more nodes by a processor of the distributed processing node to load the query as an instance on the memory;
 registering the centralized processing query in a memory of a centralized processing node among two or more nodes by a processor of the centralized processing node to load the query as an instance on the memory;
 loading an event from a permanent storage device to be loaded in the memory or receiving the event through a network connection by each node;
 causing the processor of the distributed processing node to perform the event by a distributed processing query which is loaded on the memory of the distributed processing node as an instance when the distributed processing query is capable of processing the received event; and
 determining to transmit the event to a centralized processing node by the processor of the distributed processing node when the distributed processing query is not capable of processing the event.

10. A computing device, comprising:
 one or more processors; and
 a memory which stores commands executed by the one or more processors,
  wherein the one or more processors generate an execution plan by compiling queries included in a process by a processor of a master node:
   analyze the execution plan to classify the queries into a distributed processing query which performs an operation on individual events and which is performed independently on each of the plurality of nodes and a centralized processing query which performs the operation by combining two or more events and which may perform the operation only when the entire data stream that includes a set of events is obtained by the processor of the master node,
   register the distributed processing query in a memory of one or more distributed processing nodes among two or more nodes by a processor of the distributed processing node to load the query as an instance on the memory,
   register the centralized processing query in a memory of a centralized processing node among two or more nodes by a processor of the centralized processing node to load the query as an instance on the memory,
   load an event from a permanent storage device to be loaded in the memory or receive the event through a network connection by each node
  cause the processor of the distributed processing node to perform the event by a distributed processing query which is loaded on the memory of the distributed processing node as an instance when the distributed processing query is capable of processing the received event; and
  determine to transmit the event to a centralized processing node by the processor of the distributed processing node when the distributed processing query is not capable of processing the event.

* * * * *